(12) United States Patent
Nowak

(10) Patent No.: US 12,078,140 B2
(45) Date of Patent: Sep. 3, 2024

(54) METHOD OF ELECTRIC ENERGY GENERATION AND POWER GENERATION SYSTEM, IN PARTICULAR A POWER PLANT

(71) Applicant: Zygmunt Nowak, Krosno (PL)

(72) Inventor: Zygmunt Nowak, Krosno (PL)

( * ) Notice: Subject to any disclaimer, the term of this patent is extended or adjusted under 35 U.S.C. 154(b) by 43 days.

(21) Appl. No.: 18/012,659

(22) PCT Filed: Jun. 15, 2021

(86) PCT No.: PCT/PL2021/050040
§ 371 (c)(1),
(2) Date: Dec. 23, 2022

(87) PCT Pub. No.: WO2021/262016
PCT Pub. Date: Dec. 30, 2021

(65) Prior Publication Data
US 2023/0250795 A1 Aug. 10, 2023

(30) Foreign Application Priority Data
Jun. 23, 2020 (PL) .......................................... 434411

(51) Int. Cl.
*F03B 17/06* (2006.01)
*F03B 11/00* (2006.01)

(52) U.S. Cl.
CPC .............. *F03B 17/06* (2013.01); *F03B 11/00* (2013.01); *F05B 2220/706* (2013.01); *Y02E 10/20* (2013.01)

(58) Field of Classification Search
CPC .... F03B 17/06; F03B 11/00; F05B 2220/706; Y02E 10/20
See application file for complete search history.

(56) References Cited

U.S. PATENT DOCUMENTS

| | | | | |
|---|---|---|---|---|
| 2,724,082 A | * | 11/1955 | Hornfeck | H02J 15/003 361/185 |
| 2,887,956 A | * | 5/1959 | Kunkel | F04F 7/02 417/226 |
| 3,754,147 A | * | 8/1973 | Hancock | F04F 99/00 290/1 R |

(Continued)

FOREIGN PATENT DOCUMENTS

| | | |
|---|---|---|
| CN | 204299783 U | 4/2015 |
| DE | 102010004682 A1 | 9/2012 |

(Continued)

*Primary Examiner* — Pedro J Cuevas
(74) *Attorney, Agent, or Firm* — Andrzej Malarz, Esq.

(57) ABSTRACT

A method and device for non-emission electric energy production, consisting in: generating negative pressure or vacuum inside a pressure vessel in its upper part constituting a vacuum chamber in whose space a turbine rotor is situated; setting a height of a liquid or water column in the lower part of the pressure vessel constituting a liquid or water column below the turbine rotor, wherein the vacuum chamber is directly connected with the liquid or water chamber situated below the vacuum chamber, and a conventional interface between them is determined by the upper surface of the liquid or water column; closing a first closing means and supplying a liquid or water by a means for supplying a liquid or water to the vacuum chamber.

31 Claims, 6 Drawing Sheets

(56) References Cited

U.S. PATENT DOCUMENTS

| | | | | |
|---|---|---|---|---|
| 3,810,717 A * | 5/1974 | Rakcevic | F03B 15/005 | 417/323 |
| 4,109,160 A * | 8/1978 | Goto | F03B 13/06 | 415/17 |
| 4,110,980 A * | 9/1978 | Foulke | F03B 13/00 | 417/404 |
| 4,132,901 A * | 1/1979 | Crausbay | E02B 9/00 | 417/330 |
| 4,443,707 A * | 4/1984 | Scieri | F03B 13/06 | 290/54 |
| 4,508,971 A * | 4/1985 | Bailey | F03G 6/00 | 290/1 R |
| 4,691,115 A * | 9/1987 | Robinson | F03B 17/04 | 290/1 R |
| 4,698,516 A * | 10/1987 | Thompson | F03B 13/06 | 415/916 |
| 4,739,182 A * | 4/1988 | Kenderi | F03B 13/1855 | 60/398 |
| 6,073,445 A * | 6/2000 | Johnson | F02C 6/16 | 60/512 |
| 6,359,347 B1 * | 3/2002 | Wolf | F03B 13/086 | 290/43 |
| 8,461,702 B2 * | 6/2013 | Cortes | F01K 27/005 | 415/80 |
| 8,643,206 B2 * | 2/2014 | Ekern | F03B 13/06 | 405/76 |
| 8,823,195 B2 * | 9/2014 | Legacy | F03B 13/08 | 290/43 |
| 8,899,873 B2 * | 12/2014 | Igel, V | F03B 13/06 | 405/53 |
| 10,001,107 B2 * | 6/2018 | Meager | F03B 13/086 | |
| 10,119,518 B2 * | 11/2018 | Deprugney | E02B 9/02 | |
| 10,205,323 B2 * | 2/2019 | Lowell | H02J 3/381 | |
| 10,428,786 B2 * | 10/2019 | Navarro | F16D 31/02 | |
| 10,815,962 B1 * | 10/2020 | Lu | E02B 9/02 | |
| 10,844,828 B2 * | 11/2020 | Huebner | F03B 7/003 | |
| 10,876,512 B2 * | 12/2020 | Freda | F03B 13/086 | |
| 11,073,139 B2 * | 7/2021 | Anteau | F04F 5/02 | |
| 11,286,899 B2 * | 3/2022 | Freda | F04F 10/02 | |
| 2006/0032374 A1 * | 2/2006 | Vrana | F04F 10/00 | 261/36.1 |
| 2009/0152871 A1 * | 6/2009 | Ching | F03G 7/00 | 415/916 |
| 2010/0170236 A1 * | 7/2010 | Lezi | E02B 9/06 | 60/398 |
| 2012/0019004 A1 * | 1/2012 | Ekern | E02B 9/08 | 290/53 |
| 2012/0187686 A1 * | 7/2012 | Walton | F03B 7/00 | 290/52 |
| 2012/0187687 A1 * | 7/2012 | Walton | F03B 1/00 | 290/52 |
| 2012/0187690 A1 * | 7/2012 | Walton | F03B 13/08 | 290/54 |
| 2013/0088015 A1 * | 4/2013 | Walton | F03B 3/00 | 290/54 |
| 2013/0205767 A1 * | 8/2013 | Shinde | E02B 9/00 | 60/495 |
| 2014/0193201 A1 * | 7/2014 | Stauffer | E02B 9/06 | 405/75 |
| 2015/0113968 A1 * | 4/2015 | Christensen | F03B 17/06 | 60/325 |
| 2019/0101095 A1 * | 4/2019 | Navarro | F04B 17/00 | |
| 2019/0353139 A1 * | 11/2019 | Sheldon-Coulson | F03B 13/142 | |
| 2020/0232439 A1 * | 7/2020 | Blankenship | H02K 7/1823 | |
| 2022/0364540 A1 * | 11/2022 | Navarro | F03B 15/04 | |
| 2023/0026500 A1 * | 1/2023 | Mathers | H02K 7/1823 | |
| 2023/0250795 A1 * | 8/2023 | Nowak | F03B 15/02 | 290/54 |

FOREIGN PATENT DOCUMENTS

| | | |
|---|---|---|
| JP | 2004176705 A | 6/2004 |
| JP | 2009236109 A | 10/2009 |
| KR | 20040002373 A | 1/2004 |
| KR | 202120008866 A | 2/2012 |

* cited by examiner

METHOD OF ELECTRIC ENERGY GENERATION AND POWER GENERATION SYSTEM, IN PARTICULAR A POWER PLANT

TECHNICAL FIELD

The invention relates to the field of power engineering and power plants which transform the potential energy of a liquid into electric energy. The subject matter of the invention are various methods and devices used to generate pure electric power, using the energy of a liquid or water. More precisely, the subject matter of the present invention is a method of electric energy generation and a power generation system, in particular a power plant.

PRIOR ART

In the state of the art, there are many methods of electric energy generation from renewable energy sources such as inland hydroelectric power plants, nuclear power plants, wind-turbine power plants (windmills), photovoltaic power plants (photovoltaic panels), and also geothermal power plants and sea-located water power plants using tides of seas and oceans and water streams in seas and oceans.

Inland hydroelectric power plants are located mainly on big rivers which are crossed by large water dams or barrages, which results in backwater of the river water in order to give water massive kinetic energy to drive water turbines.

Construction of water dams and barrages requires flooding large areas of lands located upstream dams and barrages, which frequently results in unfavourable environmental changes and is a threat to population and industrial infrastructure downstream dams and barrages as—if they are broken—they expose thousands of people to loss of their lives and destruction of industrial facilities and residential development.

Another unfavourable aspect connected with operation of inland hydroelectric power plants are limited rainfalls for a number of years which results in drought in many areas where water power plants are situated.

On the other hand, construction and operation of nuclear power plants require high financial expenditure for construction and storage of radioactive waste. Operation of nuclear power plants poses a risk of contamination of population and the environment as it was the case during the Chernobyl accident (former Soviet Union) and in Fukushima (Japan).

Because of these threats, nuclear power plants give rise to high social opposition and that is why many countries withhold construction of new nuclear power plants and some countries close and pull down nuclear power plants already existing and operated.

Other ways of producing clean electric energy are wind turbine power plants and photovoltaic power plants. Unfortunately, these sources of electric energy are unstable as they depend on weather conditions and they do not provide uninterrupted power generation and they frequently produce surplus electric energy at times when demand is low.

Therefore, in order to use the surplus electric energy generated by wind-turbine and photovoltaic power plants, there is a need to build large storage facilities of electric energy where thousands of batteries are used and also existing and newly-built water power plants (e.g. pumped-storage power stations) are used, which are the biggest storage facilities of electric energy.

When there are surpluses of electric energy, mainly at night, the electric energy is taken from power transmission grid by pumped-storage power stations and is used to pump over water from lower water reservoirs to upstream water reservoirs. In turn, in the periods of high demand of electric energy the water from the upstream reservoirs is directed to the blades of water turbines which provides electric energy generation for a few hours when demand for electric energy is high.

Another, though rarely used, way of electric energy production is generation of electricity in geothermal power plants, using steam generated in shallow hot layers of the Earth.

Also, in a small extent as compared with the total electric energy production all over the world, there is the electric energy generation in the tidal power plants using water tides and streams of seas and oceans.

SUMMARY OF THE INVENTION

The objective of the present invention is to propose new ways and devices which will provide zero-emission electric energy generation and, as a need may be, storage of excessive electric energy produced by water power plants and also by wind-turbine power plants and photovoltaic power plants.

In his developed technical solutions, the inventor used the phenomenon of vacuum appearance in closed vessels tops—containers filled with a liquid (e.g. mercury or water), which was first described by Evangelista Torricelli, an Italian physicist and mathematician.

In 1643 Torricelli carried out his famous experiment in which he filled a glass pipe (1 m long, closed at one end) entirely with mercury and he put an open end in a vessel full of mercury.

The level of mercury in the pipe dropped to 76 centimetres—760 mm Hg, as a portion of the mercury flowed out, as a result of gravity, to the lower vessel, the vessel connected with the glass pipe as communicating vessels and at the top closed end of the glass pipe an empty space appeared, co called Torricelli's vacuum.

Torricelli proved that there is atmospheric pressure of normal value of 1013.25 hPa, which equalizes the hydrostatic pressure exerted by 760 mm of Hg or equalized by 10332.27 mm water columns, as water has density—specific gravity 13.6 times lower than the density—specific gravity of mercury.

The inventor of the present invention—knowing the force of pressure—the atmospheric pressure exerted on the surface of the Earth and being familiar with the principle of operation of vacuum pumps—pumping water or liquid by vacuum pumps, and also being familiar with Torricelli's experiment—developed technical solutions which use the force of atmospheric pressure and the vacuum energy to perform work, in this case, for generating electric energy.

The technical solutions being the subject matter of this disclosure regard producing so called "pure electrical energy", using for this purpose the difference of pressures, i.e. the negative pressure of vacuum relative to atmospheric pressure at the surface of the Earth, which gives high kinetic energy (velocity) to a liquid or water being under normal atmospheric pressure—1013.25 hPa, flowing into a vacuum chamber in which the pressure value—vacuum—is preferably much lower than atmospheric pressure, and the liquid/water being routed to the blades of a rotor of a water turbine, which rotates and drives a power generator, which results in electric energy generation.

According to the first invention, a method of electric energy generation is proposed, in which the energy of a liquid or water is transformed into electrical energy, the method comprising following steps:
  providing a pressure vessel comprising:
    a first closing means which closes and opens an inflow opening through which a liquid or water is supplied to a pressure vessel by a means for feeding the liquid or water;
    a second closing means which closes and opens an outflow opening through which a liquid or water is discharged outside from the pressure vessel by means for discharging the liquid or water;
    a turbine with a power generator for generating electric energy where a turbine rotor is situated inside said pressure vessel;
  supplying a liquid or water to the inside of the pressure vessel towards the turbine rotor which, while rotating, drives the power generator;
  generating negative pressure or vacuum inside the pressure vessel in its top part which constitutes a vacuum chamber in whose space the turbine rotor is installed;
  setting a height of a liquid or water column in the lower part of the pressure vessel, constituting a water or liquid chamber below the turbine rotor,
  wherein the vacuum chamber is directly connected with the liquid or water chamber situated below and a conventional interface between the vacuum chamber and the water or liquid chamber is determined by the upper surface of the column of liquid or water;
  then opening the first closing means and supplying the liquid or water by the means for supplying the liquid or water to the vacuum chamber, directing the liquid or water to the turbine rotor in such a way that due to the pressure difference between the negative pressure or vacuum in the vacuum chamber and a higher pressure outside the pressure vessel, preferably the atmospheric pressure, which exerts pressure on the liquid or water supplied from outside, the liquid or water flows at high velocity into the vacuum chamber and rotates the turbine rotor which drives the power generator and produces electric energy;
  maintaining the height of the liquid or water column in the liquid or water chamber below the turbine rotor by discharging a surplus of liquid or water outside the pressure vessel by opening the second closing means and discharging the liquid or water by a means for discharging a liquid or water.
  The open end of the pressure vessel is preferably located in a lower tank or in a lower stream filled with liquid or water on a free surface of which the atmospheric pressure is exerted.
  Depending on the liquid or water used, the height h of the liquid or water column is set on the level in the range of 10 cm to 1033 cm and even more preferably over 1033 cm.
  In this method three alternative methods of creating vacuum in the pressure vessel are envisaged.
  The first method of creating vacuum in the vacuum chamber comprises the following stages:
  closing the second closing means, which opens and closes the outflow opening between the pressure vessel and the lower tank or the lower stream in which the pressure vessel is placed,
  filling the pressure vessel with a liquid or water by opening the first closing means and supplying the water or liquid by the means for supplying a liquid or water, wherein the water column preferably reaches a height above the level of the turbine rotor, and—even more preferably—the entire pressure vessel is completely filled,
  closing the first closing means and opening the second closing means, as a result of which the column of a liquid or water lowers because of its own weight until it is balanced by the atmospheric pressure exerted on the liquid or water in the lower tank or lower stream, creating vacuum in the vacuum chamber in the upper part of the pressure vessel in such a way that—in the state of equilibrium (balance)—the upper surface of the column of a liquid or water, which fills the liquid or water chamber, is below the turbine rotor.
  The second method of creating vacuum in the vacuum chamber comprises the following stages:
  opening the second closing means, which opens and closes the outflow opening between the pressure vessel and a lower tank or the lower stream of water, in which the pressure vessel is placed,
  pumping out the air from the pressure vessel by means of at least one vacuum pump, which results in lifting the level of the column of a liquid or water to a required level below the bottom edges of the turbine rotor and creating vacuum in the vacuum chamber in the upper part of the pressure vessel.
  The third method of creating vacuum in the vacuum chamber comprises pumping out a liquid or water which previously filled the pressure vessel, until the level of the liquid or water column is lowered below the turbine rotor and creating vacuum in the vacuum chamber in the upper part of the pressure vessel.
  In order to maintain a negative pressure or vacuum in the vacuum chamber and in order to maintain the level of the column of a liquid or water below the turbine rotor, during supplying a liquid or water to the vacuum chamber, the liquid or water is pumped out from the pressure vessel, preferably in the volume equal to the volume of a liquid or water which will flow into the vacuum chamber and fall down to the liquid or water chamber.
  The liquid or water can be supplied to the pressure chamber from an upper tank for liquid or water which directly surrounds (contains) the vacuum vessel in the area of the vacuum chamber or which is connected by means of a supplying duct or a channel with the upper tank.
  Alternatively, a liquid or water is supplied to the vacuum chamber from a water stream directly or by the means for supplying a liquid or water, especially by ducts or channels, wherein the vacuum chamber is situated in said water stream or at the height of the water stream.
  The negative pressures or vacuum created in the vacuum chamber adopts the values below the values of pressure outside the vacuum chamber at a given moment and this pressure is preferably the atmospheric pressure, wherein the negative pressure or vacuum preferably adopts the values in the range of 1 Pa to 101,324 Pa.
  According to the second invention there is provided a system for electric energy generation, especially a water plant, for carrying out a method according to the first invention, where the mentioned system comprises the following:
  a pressure vessel:
    an at least one inflow opening;
    an at least one outflow opening;

a first closing means which closes and opens the inflow opening through which a liquid or water is supplied to the pressure vessel by a means for feeding a liquid or water;

a second closing means which closes and opens the outflow opening through which a liquid or water is discharged outside from the pressure vessel by the means for discharging a liquid or water;

a means for supplying a liquid or water to the inside of the pressure vessel;

a means for discharging a liquid or water outside from the pressure vessel;

an at least one turbine, where a turbine rotor is situated inside the pressure vessel; a power generator for generating electric energy coupled with the turbine, said system further comprises a means for creating and/or maintaining negative pressure or vacuum inside the pressure vessel, where said pressure vessel comprises a vacuum chamber adapted for creating a negative pressure or vacuum inside said chamber, and a liquid or water chamber adapted for filling with a liquid or water, wherein the vacuum chamber is situated in the upper part of the pressure vessel and the liquid or water chamber is situated in the lower part of the pressure vessel, below the pressure chamber, wherein an interface between the vacuum chamber and the liquid or water chamber is variable in time and depends on the state of work of the system or the work cycle and is determined by the upper surface of the liquid or water column which fills the liquid or water chamber, dividing the pressure vessel into two media, i.e. a first one constituting the vacuum chamber in which there is a negative pressure or vacuum and a second one constituting the water or liquid chamber which is filled with a water or liquid in such a manner that—in the cycle of electric energy production—the upper surface of the water or liquid column is situated substantially below the turbine rotor located in the vacuum chamber, wherein the at least one inlet opening is situated in the vacuum chamber in such a way that the liquid or water supplied to the vacuum chamber by the means for supplying a liquid or water is directed towards the turbine rotor effecting its rotation and generating electric energy by the power generator.

The system further comprises an upper tank for supplying a liquid or water, which flows into the vacuum chamber by the at least one inflow opening.

The upper tank can be situated around the vacuum chamber, substantially in the area and at height of the at least one inflow opening, wherein the vacuum chamber is situated directly in said upper tank. Alternatively, the upper tank is connected by a supply duct with the at least one inflow opening in the vacuum chamber. An additional turbine rotor coupled with the power generator can be also installed in the supply duct.

The system may further comprise a lower tank for a liquid or water, in which at least the bottom part of the liquid or water chamber is placed in such a way that a flow of the liquid or water is provided between the lower tank and the liquid or water chamber, especially through the outflow opening located in the liquid or water chamber.

At least one valve, preferably situated in the at least one inflow opening in the vacuum chamber constitutes the first closing means.

At least one valve providing regulated flow of a liquid or water between the lower tank and the liquid or water chamber, preferably situated in the at least one outflow opening in the liquid or water chamber constitutes the second closing means.

The system can further comprise an upper supply reservoir for liquid or water in which the entire upper tank is contained, and also can comprise a lower storage reservoir for liquid or water, in which the entire lower tank is contained.

The vacuum chamber comprises an air valve and a vacuum pump.

In one of the embodiment, the system comprises a vacuum cylinder with an open end, connected with the vacuum chamber, wherein a movable sliding element is placed in the vacuum cylinder, said element being preferably a piston or membrane, for driving an additional power generator for generating electric energy by displacement of said movable element due to a difference of pressures between the vacuum chamber and the atmospheric pressure outside the vacuum chamber.

The piston is connected with a pull cable to a ballast and the pull cable is coupled with the additional power generator for generating electric energy, preferably by a mechanical transmission.

Alternatively, the piston is connected with a toothed bar coupled with the additional power generator for generating electric energy, preferably by a mechanical transmission.

In one of the preferred embodiments, the system further comprises plurality of pressure vessels, each of which constitute a separate stage, wherein the stages are connected in such a way that they form a cascade system.

According to the third invention there is provided a system for generating electric energy, especially a water plant, in which the energy of a liquid or water is transformed into electric energy, where the mentioned system comprises the following:

a pressure vessel comprising:
  an at least one inflow opening;
  an at least one outflow opening;
  a first closing means which closes and opens the inflow opening through which a liquid or water is supplied to the pressure vessel by a means for supplying a liquid or water;
  a second closing means which closes and opens the outflow opening through which a liquid or water is discharged outside from the pressure vessel by a means for discharging a liquid or water;
a means supplying a liquid or water to the inside of the pressure vessel;
a means for discharging a liquid or water outside from the pressure vessel;
an at least one turbine;
an at least one power generator for generating electric energy coupled with the turbine;
a means for creating or maintaining negative pressure or vacuum inside the pressure vessel,
wherein said pressure vessel comprises a vacuum chamber adapted for creating a negative pressure or vacuum inside said chamber, and a liquid or water chamber adapted for filling with a liquid or water,
wherein the vacuum chamber is situated in the upper part of the pressure vessel and the liquid or water chamber is located in the lower part of the pressure vessel, below the pressure chamber, wherein an interface between the vacuum chamber and the liquid or water chamber is variable in time and depends on the state of work of the system or the work cycle and is determined by the upper surface of a liquid or water column filling the liquid or water chamber, dividing the pressure vessel into two media, i.e. a first one constituting the vacuum chamber, in which there is a negative pressure or vacuum and a second one constituting the water or liquid chamber filled with water or a liquid in such a manner that—in the cycle of electric energy production—the upper surface of the water or liquid column is situated substantially below the first closing means or the inflow opening located in the vacuum chamber, wherein a turbine rotor is placed outside the pressure vessel in such a manner that it can be driven by a supplying liquid or water supplied by the liquid and water supplying means to the pressure vessel.

The turbine rotor is situated in the duct supplying the supplying liquid or water and connecting an upper tank with the inflow opening in the vacuum chamber.

Additionally, another turbine rotor can be situated in the vacuum chamber in such a way that the liquid or water flowing into the pressure vessel is directed through the inflow opening in the vacuum chamber onto the turbine rotor effecting its rotation and generating electric energy by the power generator.

According to the fourth invention there is provided a system for generating electric energy, especially a water plant, in which the energy of a liquid or water is transformed into electric energy, where said system comprises the following:

a pressure vessel comprising:
 an at least one inflow opening;
 an at least one outflow opening;
 first closing means which closes and opens the inflow opening through which a liquid or water is supplied to the pressure vessel by a means for supplying the liquid or water;
 a second closing means which closes and opens the outflow opening through which a liquid or water is discharged outside from the pressure vessel by a means for discharging a liquid or water;
a means for supplying a liquid or water to the inside of the pressure vessel;
a means for discharging a liquid or water outside from the pressure vessel;
an at least one turbine;
an at least power generator for generating electric energy coupled with the turbine;
a means for creating or maintaining negative pressure or vacuum inside the pressure vessel,
wherein said pressure vessel comprises a vacuum chamber adapted for creating a negative pressure or vacuum inside chamber, and a liquid or water chamber adapted for filling with a liquid or water,
wherein the vacuum chamber is situated in the upper part of the pressure vessel and the liquid or water chamber is located in the lower part of the pressure vessel, below the pressure chamber,
wherein an interface between the vacuum chamber and the liquid or water chamber is variable in time and depends on the state of work of the system or the work cycle and is determined by the upper surface of a liquid or water column filling the liquid or water chamber, dividing the pressure vessel into two media, i.e. a first one constituting the vacuum chamber in which there is a negative pressure or vacuum and a second one constituting the water or liquid chamber filled with a water or liquid in such a manner that—in the cycle of electric energy production—the upper surface of the water or liquid column in situated substantially below the first closing means or the at least one inflow opening located in the vacuum chamber, wherein the system further comprises a vacuum cylinder with an open end, connected with the vacuum chamber, wherein a movable sliding element is placed in said vacuum cylinder, the movable sliding element being preferably a piston or membrane, for driving the power generator by displacement of said movable sliding element due to the difference of pressure between the vacuum chamber and a higher pressure outside the vacuum chamber, the latter is preferable the atmospheric pressure.

The piston is connected with a pull cable to a ballast and the pull cable is coupled with an additional power generator for generating electric energy, preferably by a mechanical transmission. Alternatively, the piston is connected with a toothed bar with the additional power generator, preferably by a mechanical transmission.

The additional turbine rotor can be situated in the vacuum chamber in such a way that a liquid or water flowing into to the pressure vessel is directed through the inflow opening in the vacuum chamber onto the turbine rotor effecting its rotation and generating electric energy by a power generator.

Advantageous Effects of the Invention

An advantage of the present invention is a possibility of non-emission generation of electric energy in an eco-friendly manner, including for the population, as greenhouse gases emission and toxic gases and dust contaminants, generated during combustion of energy raw materials in power plants, will be eliminated.

Common application of this invention will contribute to reduction of electric energy prices, which will have a positive effect on the economic development of many countries of the world.

DETAILED DESCRIPTION OF PREFERRED EMBODIMENTS OF THE INVENTION

FIG. 1-5 depict various preferred examples of the system for production of electricity, which further in the description will be referred to as a water power plant in each case.

Example I

Figure 1:
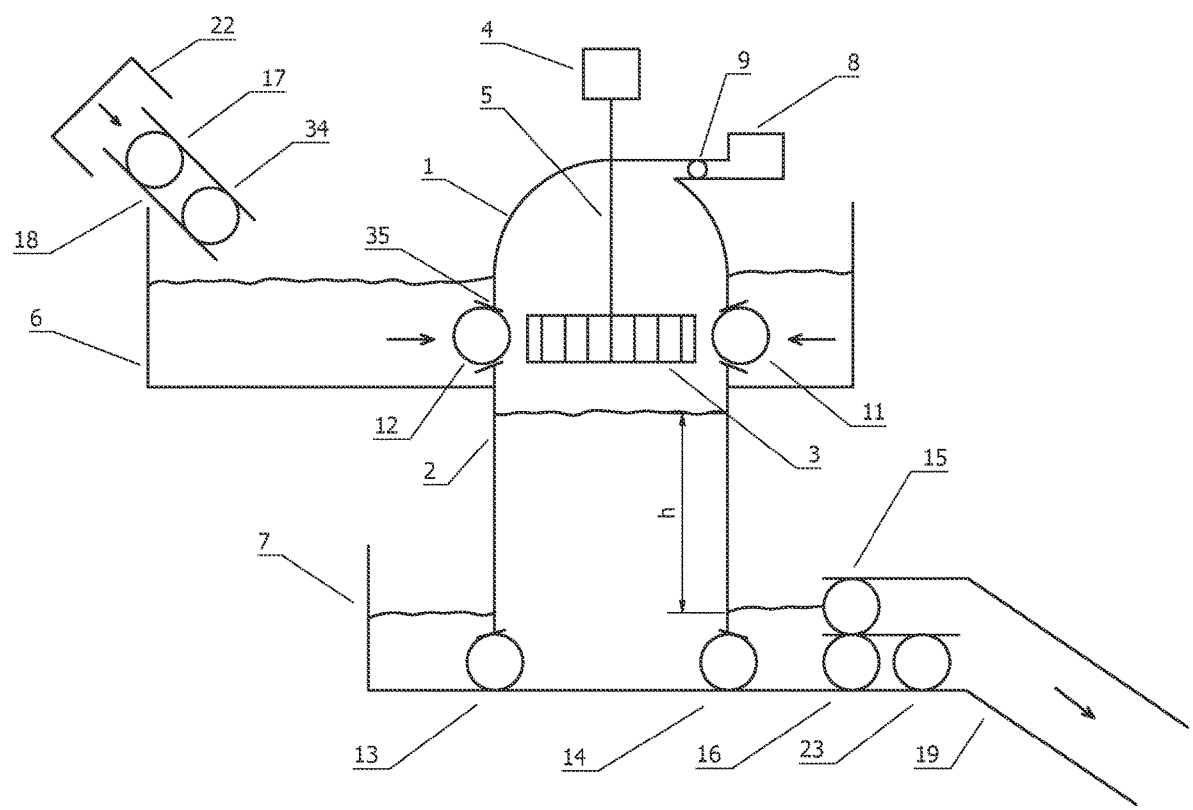
FIG. 1—depicts a schematic diagram of a single water power plant according to the first embodiment.
Figure 1A:
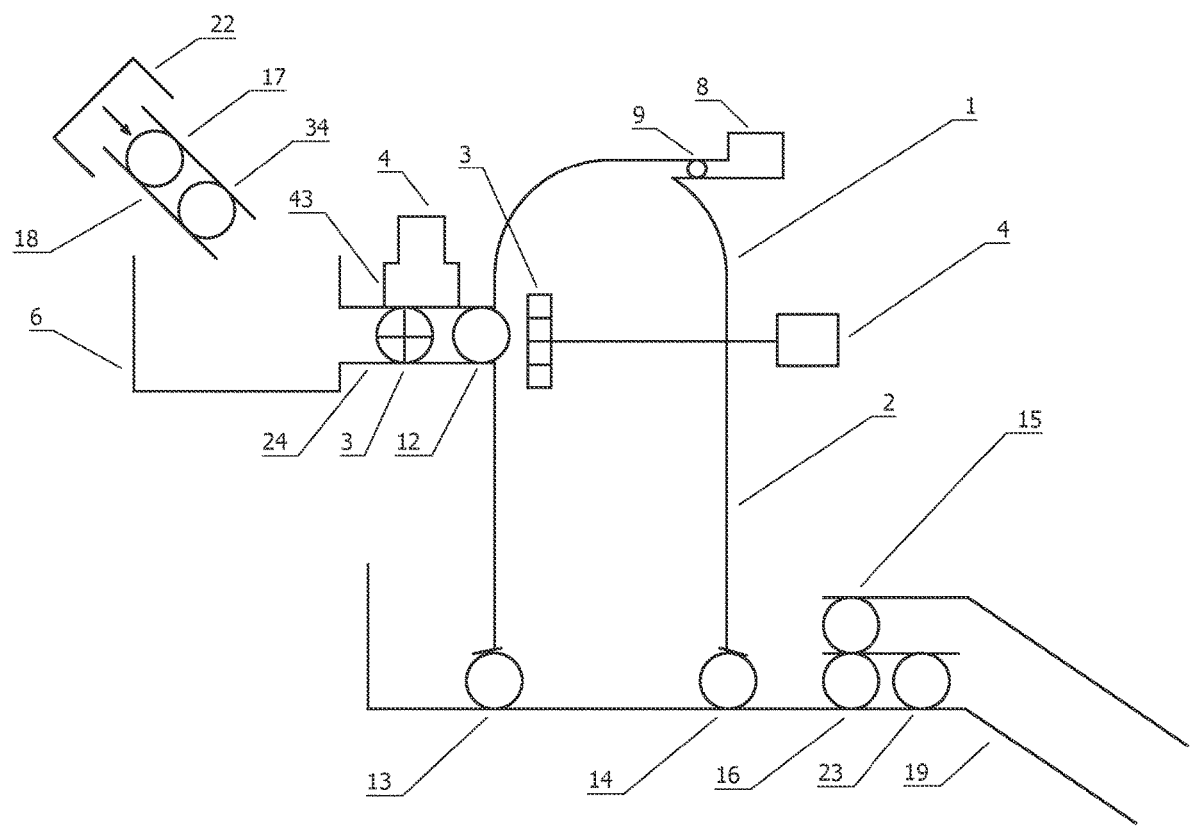
FIG. 1a—depicts other embodiment of the water power plant from FIG. 1.

In FIG. 1a schematic diagram is shown of the first embodiment of the invention in a form of a water power plant situated preferably on a bank of a river, stream, water channel, reservoir, water dam/barrage, weir, waterfall or in industrial sites (e.g. in refineries).

The water power plant presented in this example comprises one hermetic pressure vessel 1, 2 having a form of a cylindrical vessel with a half-round head (dome) and an open end. The pressure vessel 1, 2 in its upper part has a vacuum chamber 1 and in its lower part a liquid or water chamber 2. The vacuum chamber 1 is suitable for generation of a negative pressure or vacuum and the liquid or water chamber 2 is suitable to be filled with a liquid or water. The vacuum chamber 1 is connected with the liquid or water chamber 2 but one should bear in mind that it is a conventional separation depending on the operating conditions of the water power plant and is variable in time. In other words, these are not permanent separated elements and in fact there is no physical barrier between chambers 1 and 2. The division into the vacuum chamber 1 and the liquid or water chamber 2 only refers to the status in which vacuum or negative pressure was generated in the upper part and this part of the pressure vessel 1, 2 was called the vacuum chamber 1 and the lower part of the pressure vessel 1, 2 is filled with a liquid or water and is called the liquid or water chamber 2. Such a condition can be attained, for example, by generating vacuum according to the Torricelli's experiment referred to above.

At the same time, it should be explained that the phrases used in the description: "vacuum", "vacuum negative pressure" and "negative pressure" are equal to one another and used interchangeably, as far as not indicated otherwise in the description, and they generally mean a pressure below the atmospheric ambient pressure which is outside the pressure vessel.

Preferably, the value of the vacuum generated in the vacuum chamber is from 1 Pa to 101,324 Pa, and even more preferably takes values from the range from 1000 to 5000 Pa.

In the vacuum chamber 1 at least one valve 11, 12 or a different mean is installed, which closes and opens an inflow opening through which a liquid or water is supplied to pressure vessel 1, 2, and more precisely into the inside of the vacuum chamber 1. The inflow opening, valve or other closing mean can also feature directing means 35 which increase the velocity of the water or liquid flowing into the vacuum chamber 1.

Preferably, the vacuum chamber 1 has also at least one air valve 9 and at least one vacuum pump 8.

In the liquid or water chamber 2 at least one valve 13, 14 or a different mean is installed, which closes and opens an outflow opening through which a liquid or water is discharged outside from the liquid or water chamber 2.

The pressure vessel 1, 2 has its open end immersed in the liquid or water which fills a lower tank 7 or—optionally—a lower stream of water. Valves 13, 14 in liquid or the water chamber 2 are used to regulate the flow of the liquid or water between the lower tank 7 and the liquid or water chamber 2. The lower tank 7 is preferably connected with a discharge duct 19 (e.g. a channel or pipeline) by means of valves 15, 16 through which the liquid or water can be discharged, e.g. to a river or another water reservoir. Preferably, the lower tank 7 is also equipped with a pump 23 for pumping water or liquid. The valve 16 and pump 23 allow to remove sediments which settle in the lower tank 7.

In the upper part of the pressure vessel 1, 2, at the height of the vacuum chamber 1 there is an upper tank 6 filled with a liquid or water. The vacuum chamber 1 is installed in this upper tank 6 in such a manner that a liquid or water filling this upper tank 6 surrounds the vacuum chamber 1 at least at the height of the inflow opening and preferably above the inflow opening and above the at least of one valve 11, 12.

Liquid or water is supplied to the upper tank 6 by a supply duct 18 (e.g. a channel or pipeline), comprising a valve 17 and a pump 34, to pump the liquid or water. Preferably, the supply duct 18 comprises a filtrating grate 22 which deters aqueous living organisms and prevents getting contaminants, which would further damage a turbine 3 rotor blades, into the upper tank 6.

Alternatively, the upper tank 6 can also be a lower stream of water which will supply water directly to flow into the vacuum chamber 1.

Due to the difference of pressures inside and outside vacuum chamber 1, the pressure vessel 1, 2 should be designed and fabricated from materials strong enough as the vacuum chamber 1 will be affected by great forces of atmospheric pressure which can be up to 10,000 kg per 1 square metre (as an example, for 10 square metres the pressing force will be up to 100 MT (metric tonne). Therefore, it is preferable to shape the vacuum chamber 1 and the entire pressure vessel 1, 2 as spheres or cylinders, which will definitely increase the durability of the structure.

The pressure vessel 1, 2 is preferably a vertical structure but it can be also inclined at an angle smaller than the right angle in relation to a free surface of liquid or water in which it is immersed. In addition, the vacuum chamber 1 can also be connected with the at least one liquid or water chamber 2 at an angle smaller than the angle of 180 degrees; in other words chambers 1 and 2 are not situated coaxially towards each other. Then a sloping liquid or water chamber 2 can have a greater length, e.g. 100 m.

In the case of a liquid and water chamber 2 oriented obliquely, its lower part is preferably immersed—connected as communicating vessels—with a watercourse and not with the lower tank 7. Similarly, the vacuum chamber 1 is set in the lower stream of water and not in the upper tank 6.

The Principle of Start-Up and Operation of a Water Power Plant Presented in FIG. 1

In order to implement the method of electric energy generation in compliance with the invention, negative pressure or vacuum should be generated in the pressure vessel 1, 2. In order to do this, the lower valves 13, 14 in the liquid or water chamber 2 get closed and the air valve 9 and at least one valve 11, 12 in the vacuum chamber 1, and a valve 17 installed in the supply duct 18 gets open. Getting valves 11, 12 and 17 open results in inflow of liquid or water from the upper tank 6 to the pressure vessel 1, 2. In this way, the pressure vessel 1, 2 should be filled completely with a liquid or water to obtain the height h of the liquid or water column above 1033 centimetres, e.g. 1200 cm.

Afterwards, the air valve 9 and valves 11, 12 get closed and at least one valve 13, 14 in the liquid or water chamber 2 get open, which results in outflow of a portion of liquid or water from the pressure chamber 1, 2, lowering the water column by its weight to the height of 1033 cm and generation of vacuum in the upper part of pressure vessel 1, 2 referred to as vacuum chamber 1. Empty space—vacuum will appear above the upper surface of the water column.

Then the height h of the liquid or water column is set in the liquid or water chamber 2 in such a way that the upper surface of the liquid or water is situated below the bottom surface of the turbine rotor 3. Preferably, the height h of liquid or water column is set at the level from 0.1 m to 10.33 m, and even more preferably, above 10.33 m (in the case of lighter liquids).

There is also a different way of generating negative pressure or vacuum in the vacuum chamber 1. For this purpose, with open at least one valve 13, 14, the air from the vacuum chamber 1 should be pumped out by at least one vacuum pump 8, which shall result in increasing the level of liquid or water in the liquid or water chamber 2, to a required level, i.e. below the lower edges of turbine rotor 3. However, this way of generating vacuum requires the use of a lot of electric energy to drive the vacuum pump 8.

Yet another method of creating negative pressure or vacuum consists in pumping out a liquid or water which previously filled the pressure vessel 1, 2, until the height h of the liquid or water column is lowered below the turbine rotor 3 and vacuum is achieved in the vacuum chamber 1 in the upper part of the pressure vessel 1, 2.

After achieving vacuum in the vacuum chamber 1, the valves 11, 12 get open, which results in dynamic inflow of liquid or water from the upper tank 6, which is under normal atmospheric pressure, to the vacuum chamber 1, in which negative pressure is much lower than normal atmospheric pressure. Depending on the height h of the liquid or water and the negative pressure (e.g. amounting to 50 hPa), the liquid or water is given big kinetic energy—high velocity, as a result of which the liquid or water will flow into the vacuum chamber 1 at high velocity, where it will be directed onto the blades of turbine rotor 3 which—coupled with a power generator 4—will be given rotary motion, which will result in electrical energy generation, which can be transferred to the power grid or to an electric energy storage facility.

It is preferable to maintain the pressure (negative pressure) in the vacuum chamber 1 and not to allow the liquid or water to boil. For example, if the temperature of water is below 30 degrees Celsius, then the pressure (negative pressure) of 50 hPa will not cause boiling (cavitation) and evaporation of water, which is not preferable for operation of water power plant.

The liquid or water after passing through the blades of the turbine rotor 3 will lose its kinetic energy which it will give to the turbine rotor 3 and afterwards it will start falling freely to the liquid or water chamber 2 situated below. This will cause increasing the level of liquid or water column in the liquid or water chamber 2 and thus it will result in loss of balance—exceeding the balance condition between the sum of the liquid or water column pressure in the chamber 2 and the pressure of vacuum in the vacuum chamber 1, and the value of the air column pressure—the atmospheric pressure, exerting the pressure force of the free surface of liquid or water in the lower tank 7, connected—as communicating vessels—with the liquid or water chamber 2, which will result in outflow of the liquid or water from the liquid or water chamber 2 to the lower tank 7, from where the liquid or water can be discharged to the discharge duct 19.

The same volume of liquid or water which will flow into the vacuum chamber 1 and flow through the vacuum chamber 1 to the liquid or water chamber 2 situated below, in a unit of time, will also flow out of the liquid or water chamber 2 into the lower tank 7 and then through the discharge duct 19 to a different tank or the lower stream of water.

Below is a detailed description of the steps making up the method of electric energy generation according to the invention.

a—opening valves 11, 12, 13, 14, 15, 17, which causes, consecutively, inflow of liquid or water into the supply duct 18, and then into the upper tank 6, into the vacuum chamber 1, into the liquid or water chamber 2, into the lower tank 7 and into the discharge duct 19, b—when liquid or water starts to flow out through a valve 15 to the discharge duct 19, closing valves 13 and 14 and opening the air valve 9, c—closing valves 13 and 14 will result in rising the liquid or water, which will completely fill in the liquid and water chamber 2 and at least partially or entirely the vacuum chamber 1, which depends on the level of liquid or water in the upper tank 6, d—alternatively, closing the air valve 9 and starting the vacuum pump 8, if the level of liquid or water is too low, which will result in pumping out the air from the vacuum chamber 1 and increase the liquid or water column to the maximum required level and there will be some air of partially lowered pressure, below the atmospheric pressure, left in the upper part of vacuum chamber 1, e—afterwards, if step d was carried out, the vacuum pump 8 should be switched off and valves 11 and 12 closed; optionally only valves 11, 12 should be closed, f—then opening valves 13 and 14, which will result in outflow of a portion of liquid or water under their own weight from the vacuum chamber 1 and a decrease of the liquid or water column, which, at the same time, will cause further decompression of the air in the upper part of vacuum chamber 1 and achieving vacuum of higher value of negative pressure, g—setting height h of the liquid or water column in the liquid or water chamber 2 on the level of the bottom edge of the turbine rotor 3 (e.g. below 0.5 m), so as not to disturb the rotary movement of the turbine rotor 3.

h—alternatively, if height h of the liquid or water column is too high, opening the air valve 9 for a specified period of time, in order to suck an appropriate volume of air to the upper part of vacuum chamber 1, which will result in an increase of pressure and thus a decrease of negative pressure of vacuum in the vacuum chamber 1, and which, in turn, will result in lowering height h of liquid or water column in the liquid or water chamber 2 below the turbine rotor 3, i—then, after stabilisation of height h of liquid or water column, and thus stabilisation the value of negative pressure of vacuum in the vacuum chamber 1, opening the valves 11 and 12, which will result in a dynamic inflow of liquid or water into the vacuum chamber 1, directed onto the blades of the turbine rotor 3 which—set in rotary motion—will drive the power generator 4 which will generate electric energy, j—the liquid or water flowing in and driving turbine rotor 3 gives out its kinetic energy and after passing through the turbine rotor 3 freely falls to the liquid or water chamber 2 which, as communicating vessels, is connected with the lower tank 7, which will result in raising the level of liquid or water in the lower tank 7 and its outflow through the valve 15 to discharge duct 19.

A water power plant constructed in this way can generate electric energy in a continuous (uninterrupted) manner when adequate level differences are ensured, at which the upper tank 6 and lower tank 7 are situated and when there is possible free outflow of liquid or water from the lower tank 7 to the discharge duct 19 and then to the lower stream of water, e.g. to a downstream section of the river.

In one alternative embodiment of the invention, the water power plant can produce electric energy in a cyclic manner when it is built and operates as an electric energy storage facility.

For this purpose the upper tank 6 should be situated above the river (lower stream of water) level and the supply duct 18 is equipped with at least one pump 34 which will pump the liquid or water to the upper tank 6 at the time of small demand for electric energy. On the other hand, the lower tank 7 should be situated at the level of water table of the liquid or water in the river (or a lower stream of water), which will provide automatic outflow of the liquid or water to the river (or a lower stream of water).

In the foregoing version of the first embodiment, the upper tank 6 is filled in during small demand for electric energy, e.g. at night or at time of surpluses of electric energy in the power grid, produced by unstable sources of electric energy such as wind-turbine power plants or photovoltaic power plants. The water power plant is set into operation at the time of high demand for electric energy.

In this version of the first embodiment of the invention, it is preferable to situate the water power plant on small rivers, watercourses of low flow, e.g. mountain streams where the upper tank 6 is filled in at the time of small or medium electric energy demand.

In the second version of the first embodiment of the invention, the water power plant produces electric energy in a cyclic manner. For this purpose the upper tank 6 is situated at the level of water table in a river or lower stream of water where liquid or water can directly and automatically flow into the upper tank 6. On the other hand, the lower tank 7 is situated below the water table of liquid or water and the liquid or water is pumped out by at least one pump 23 from the lower tank 7 to e.g. the downstream section of the river or lower stream of water.

In the third version of the first embodiment, the water power plant is an electric energy storage facility and operates on a similar basis as pumped-storage power stations, i.e. during high electric energy demand it produces electric energy which it supplies to the power grid and the liquid or water which drives the turbine rotor 3 is collected in the lower tank 7 from where it is pumped out by means of at least one pump 23 powered by electric energy taken from the grid during small demand, e.g. at night or during the occurrence of electric energy surpluses in the power grid.

In this third version of the first embodiment, it is preferable to build water power plants in particular in lowland areas where there are no great differences in levels of rivers but rivers carry large amounts of water which can fill in the upper tank 6 or directly supply the vacuum chamber 1 at every moment of day and night. On the other hand, the liquid or water which will fill in the lower tank 7, preferably having high capacity, will be pumped out from this lower tank 7 during small electric energy demand.

In FIG. 1a the fourth preferable version of the first embodiment is presented, which is basically similar to the example presented in FIG. 1.

The difference is that vacuum chamber 1 is situated outside of the upper tank 6 and is connected by the supply duct 24 (e.g. channel or pipeline) with said upper tank 6.

In this version an additional turbine rotor 3 is placed inside the supply duct 24 and it is connected with a mechanical transmission 43 which is coupled with the power generator 4, or directly with said power generator 4 without the mechanical transmission 43.

This additional turbine rotor 3 can be a slow-rotation turbine when it is connected with the mechanical transmission 43 or it can be a fast-rotation turbine when it is coupled directly with the power generator 4.

However, it should be noted that it is possible to envisage also a version the embodiment in which the turbine rotor 3 is placed outside the vacuum chamber 1 and is driven by a stream of supply liquid or water which is supplied by the liquid or water supply means to the inside of the pressure vessel 1, 2. Such a version of the embodiment is depicted in FIG. 1a, where the turbine rotor 3 was removed from the vacuum chamber 1 and electric energy is generated by the turbine rotor 3 installed in the supply duct 24, which is set in motion by liquid or water flowing in and it turns the power generator 4 which, in turn, produces electric energy.

The principle of start-up and operation of the water power plant presented in FIG. 1a are similar to those in the case of start-up and operation of the water power plant presented in FIG. 1, except for the difference described above.

Example II

Figure 2:
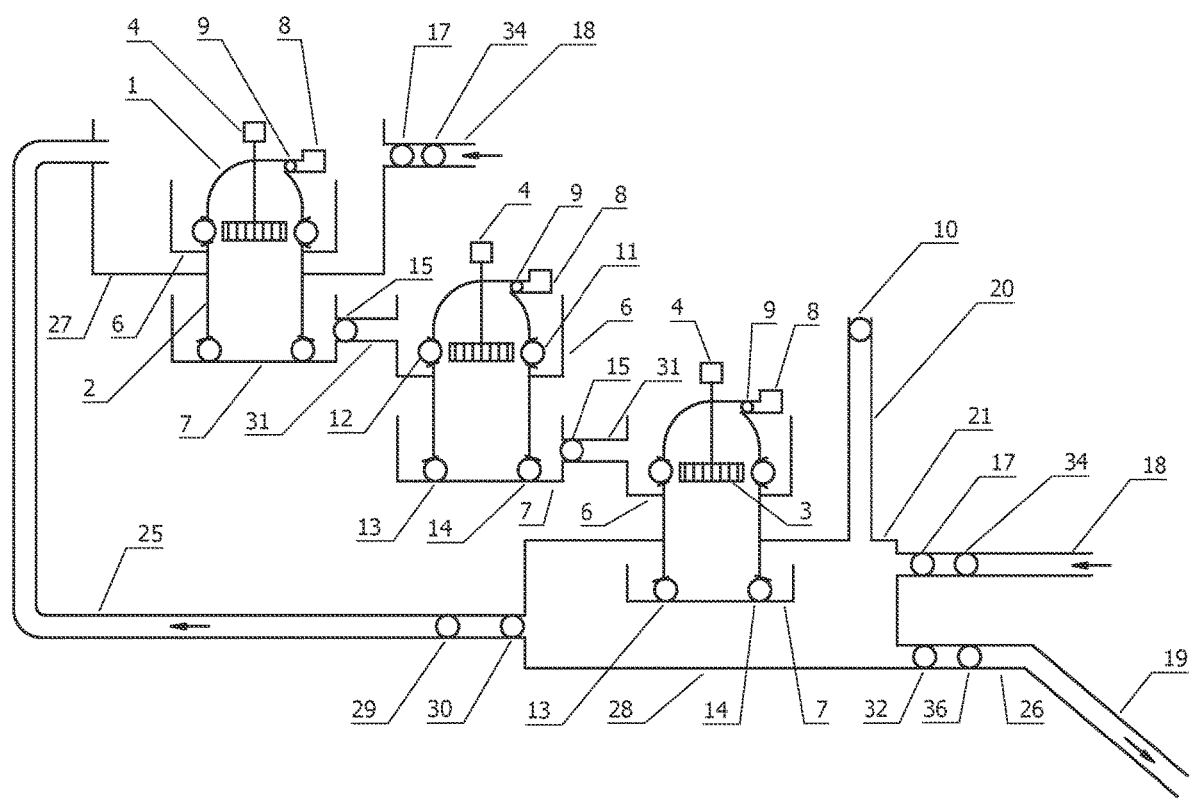
FIG. 2—depicts a schematic diagram of a cascade-and-pump water power plant according to the second embodiment.

In FIG. 2 a schematic diagram of the second embodiment of the invention is presented in the form of the cascade-pump water power plant which is composed of many stages where each stage is in practice an individual water power plant and they work together as a system—a cascade of power plants.

In the presented embodiment the water power plant is made up of three stages each of which is situated below the previous one. Each stage also comprises the pressure vessel 1, 2 and most of the elements which were presented in the first embodiment in FIG. 1.

The power plant cascade is situated preferably between an upper supply reservoir 27, located at the highest level and a lower storage reservoir 28, located at the lowest level, and the upper supply reservoir 27 is connected with the lower storage reservoir 28 by a main connecting duct 25 through which liquid or water is pumped from the lower storage reservoir 28 to the upper supply reservoir 27.

The individual adjacent stages are connected with one another by a connecting tube 31 (e.g. channel or pipeline) in such a way that said connecting tube 31 connects the lower tank 7 of the first stage of the cascade with the upper tank 6 of the second stage of the cascade situated below and so on. Owing to such a design liquid or water circulates in closed cycle and the water power plant can work as a large electric energy storage facility, like pumped-storage power stations.

In a preferable version of the embodiment, the water power plant comprises at least one upper supply reservoir 27 of large capacity, at least one lower storage reservoir 28 of large capacity and at least one cascade comprising the upper tank 6 and the lower tank 7 of much less capacities than reservoirs 27 and 28. The number of cascade stages depends of the value of the levels difference between the upper supply reservoir 27 and the lower storage reservoir 28. If, for example, the difference of levels between the upper supply reservoir 27 and the lower storage reservoir 28 is 400 metres, the cascade can contain 25 to 35 stages. Liquid or water, flowing sequentially through all the cascade stages, working as communicating vessels, will produce electric current at every stage of the cascade. After flowing in the end to the lower storage reservoir 28 of large capacity (e.g. counted in millions of cubic metres) liquid or water will be pumped by a pump 29 via the main connecting duct 25 to the upper supply reservoir 27 during small demand for electric energy, e.g. at night.

In another version of this embodiment the upper supply reservoir 27 and the upper tank 6 are filled with liquid or water pumped by the pump 34 from an external source at the time of small demand for electric energy. On the other hand, liquid or water flowing to the lowest-situated tank 7 and the lower storage reservoir 28 flows automatically through the discharge duct 19.

In yet another version of this embodiment, liquid or water automatically flows to the uppermost situated tank 6 and supply reservoir 27 from where it then flows to the lower, lowest-situated tank 7 and storage reservoir 28, from where liquid or water is pumped out by a pump 36, e.g. to a river or watercourse, during small demand for electric energy.

Preferably, water power plant working in a cascade system can additionally have an air ventilation duct 20 equipped with an air valve 10 and a thermal and hermetic protecting guard 21 of tanks and reservoirs 6, 7, 27, 28, preventing evaporation and freezing of liquid or water.

The remaining reference numerals are identical to those in FIG. 1 and FIG. 1a.

The Principle of Start-Up and Operation of a Cascade-Pump Water Power Plant in FIG. 2

The general design and the principles of start-up and operation are similar to the design and the principles of start-up and operation of the water power plant presented in FIG. 1, FIG. 1a.

Below is a detailed description of the steps making up the method of electric energy generation according to the invention.

a—opening the valve 17, which is installed in the supply duct 18 (e.g. channel or pipeline), which is connected with the lower storage reservoir 28, which results in the inflow of liquid or water and filling in the lower storage reservoir 28 and the lower tank 7 of the cascade lowest stage, which is placed in said lower storage reservoir 28, b—then opening a valve 30, situated in the main connecting duct 25 and pump 29, which pumps liquid or water through this main connecting duct 25 to the upper supply reservoir 27 and the upper tank 6 of the utmost stage of the cascade, which both get filled with liquid or water to a pre-determined level, preferable above at least one valve 11, 12, c—then opening valves 11, 12, 13, 14, 15 and air valves 9, 10 at the all cascade stages, i.e. in all vacuum chambers 1 and liquid or water tanks 2, and in lower and upper tanks 6, 7, and in connecting tubes 31 of individual stages, which will result in inflow of liquid or water to all vacuum chambers 1 and to all liquid or water chambers 2, and to all lower and upper tanks 6, 7, d—when liquid or water starts flowing out through valves 13, 14 at the lowest situated stage to the lower tank 7 and then to the lower storage reservoir 28, valves 13, 14 get closed in the lowest situated lower tank 7, e—after closing valves 13, 14, in the lowest-situated pressure vessel 1, 2, complete filling the liquid or water chamber 2 with the flowing liquid or water and complete or partial filing the vacuum chamber 1 with the flowing liquid or water, f—then closing valves 11, 12 in lowest-situated pressure vessel 1, 2, which results in an increase of the liquid or water level in the lowest situated lower tank 6, g then closing valves 13, 14 in pressure vessel 1, 2 of the higher-situated stage, h—closing valves 13, 14 of the pressure vessel 1, 2 at the higher-situated stage will result in complete filling the liquid or water chamber 2 with liquid or water flowing in and partial filling above the upper edges of valves 11, 12—or complete filling of the vacuum chamber 1 belonging to this higher-situated stage, which depends on the level of liquid or water in the lower tank 6 belonging to this stage; this process should be repeated until the highest-situated pressure vessel 1,2 is filled, i—then switching of the pump 29 and a closing the valve 30 in the lower storage reservoir 28, j—generating vacuum in all the vacuum chambers 1 of every stage of the cascade and for this purpose all air valves 9 situated in the vacuum chambers 1 of all stages should be closed, k—opening valves 13, 14 in the liquid or water chamber 2 situated in the lower tanks 7 at each cascade stage, which results in lowering the liquid or water column as a result of their own weight, and if the vacuum chamber 1 was filled completely with liquid or water and if the height h of liquid or water column exceeded 1033 cm, e.g. it was 1200 cm, then empty space, i.e. vacuum, appears in the upper part of vacuum chamber. However, if the vacuum chamber 1 was not completely filled with liquid or water and the height h of liquid or water column was 1000 cm or less, e.g. 500 cm, then also height h of the liquid or water column will be decreased and the air will get decompressed (negative pressure will result) in the upper part of vacuum chamber 1, to a specified level of balance between the value of negative pressure in the vacuum chamber 1, the value of pressure force of the liquid or water column, and the value of atmospheric pressure exerting its pressing force on the open surface of liquid or water in the lower tank 7, l—liquid or water flowing out from vacuum chambers 1 fall freely as a result of gravitation force to the lower-situated liquid or water chambers 2 from where it flows out to the lower tanks 7, on the principle of communicating vessels, which results in a slight increase of level of liquid or water in these lower tanks 7, to a specified level, when liquid or water will start to overflow to the lower storage reservoir 28, h—then the height h of the liquid or water column is set in all pressure vessels 1,2, i.e. in the liquid or water chambers 2 at all stages and if the height of the liquid or water column too high, air valves 9 in the relevant vacuum chambers 1 get open for a specified period of time, which will result in inflow of air to the vacuum chambers 1, and thus a decrease of negative pressure and this, in turn, will result in lowering height h of liquid or water column to a level below the lower edge of turbine rotor 3, n—then opening valves 11 and 12 in vacuum chamber 1 of the first, uppermost situated stage, which will result in a dynamic inflow of liquid or water at high velocity into vacuum chamber 1, directed onto the blades of the turbine rotor 3 which is coupled with power generator 4.

The kinetic energy of liquid or water will be transferred onto the blades of turbine rotor 3 which will be set in rotary motion together with the rotor of the power generator 4, which will start the process of electric energy production by the first, uppermost-situated stage of the cascade, o—the liquid or water after flowing into the vacuum chamber 1 will transfer its kinetic energy onto the blades of turbine rotor 3 and it will be falling freely to the liquid or water chamber 2 situated below, from where it will flow out, as per the principle of communicating vessels, to the lower tank 7, p—afterwards, when liquid or water starts flowing out through the valve 15 to the upper tank 6 of the next, lower stage, liquid or water valves 11, 12 get open in the vacuum chamber 1 of lower-situated stage, while in the lowest-situated stage of the cascade liquid or water will start to overflow from lower tank 7 to lower storage reservoir 28, r—opening valves 11, 12 in the vacuum chamber 1 of lower-situated stage will result in a dynamic inflow of liquid or water onto the blades of turbine rotor 3 which will be set in rotary motion together with the rotor of the power generator 4, which will start energy production by this lower-situated stage, s—while starting up consecutive lower stages the procedure is similar to that indicated above (a water power station can have many, in particular several or several tens, an even more than one hundred stages, which depends on the magnitude of the difference of levels between the upper highest-situated stage and the lowest-situated stage), t—when the lowest stage of the cascade complex is started, then liquid or water flowing out from the lower tank 7 located in lowest-situated stage starts flowing out to the lower storage reservoir 28, which preferably has valves 17, 32 installed appropriately in the supply duct 18 and an outlet duct 26 connected with the discharge duct 19 and the pump 36 installed in the outlet duct 26, allowing removal of sediments from the lower storage reservoir 28 and discharging them to the discharge duct 19.

It is assumed that the upper supply reservoir 27 and the lower storage reservoir 28 can preferably have large capacities counted in millions of cubic metres and liquid or water from the storage reservoir 28 can be pumped over to the upper supply reservoir 27 when there is a low demand for electric energy, e.g. at night, when prices of electric energy are low.

Example III

Figure 3:
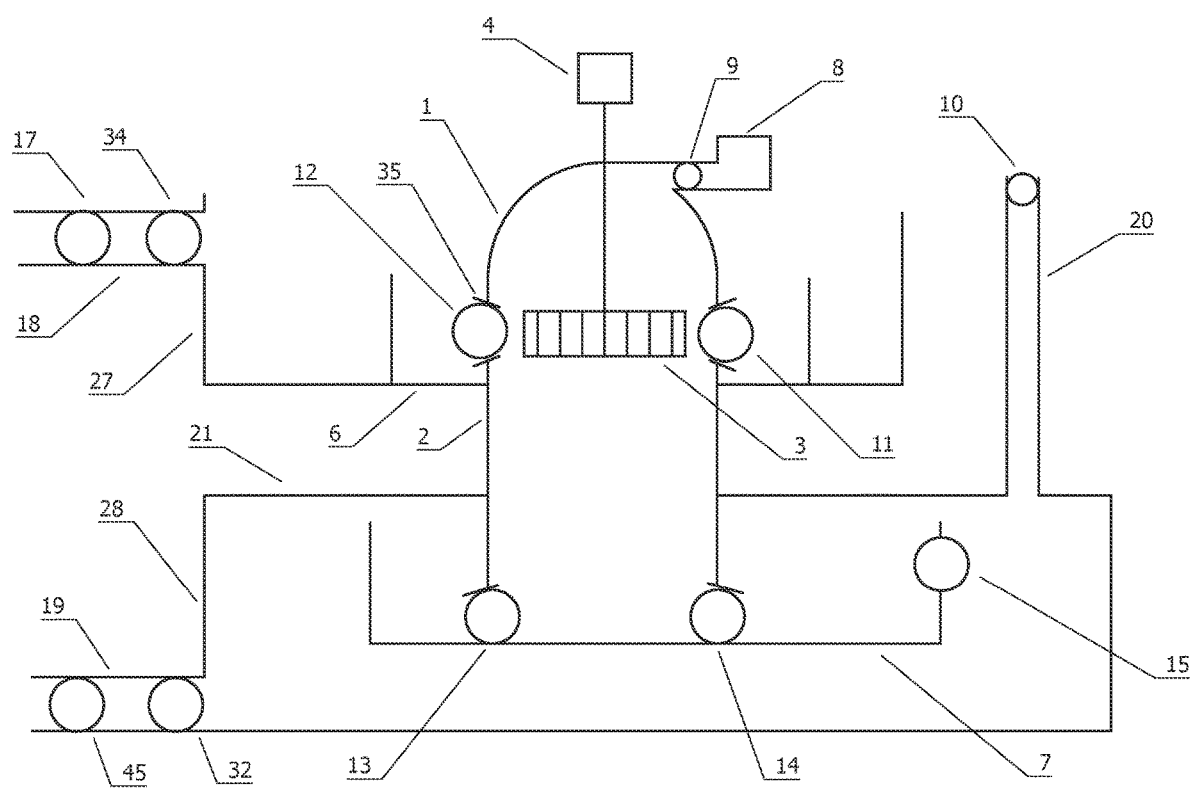
FIG. 3—depicts a schematic diagram of a tidal water power plant according to the third embodiment.

In FIG. 3 a schematic diagram of the third embodiment is presented in the form of water tidal power plant where tides of seas and oceans are used, situated preferably on the sea shore and/or ocean shore.

Reference numerals presented in FIG. 3 are identical to those in FIG. 1, FIG. 1a, FIG. 2.

A water tidal power plant is made up of at least one upper supply reservoir 27 having large capacity and filled with sea water in the time of maximum high tide of a sea or ocean and at least one lower storage reservoir 28 having preferably a capacity larger than that of upper supply reservoir 27 and emptied of sea water at the time of minimum ebb tide of a sea or ocean. Besides, water tidal power plant has also the pressure vessel 1, 2 immersed in the lower tank 7, and the upper tank 6 where the vacuum chamber 1 is situated. Pressure vessel 1, 2 is preferably situated between the upper supply reservoir 27 and the lower storage reservoir 28. The upper tank 6 is preferably situated in the upper supply reservoir 27 and the lower tank 7 is located in the lower storage reservoir 28.

The Principle of Start-Up and Operation of a Water Tidal Power Plant in FIG. 3

The general design and the principles of start-up and operation are similar to the design and the principles of start-up and operation of the water power plant presented in FIG. 1, FIG. 1a and FIG. 2.

Below is a detailed description of the steps making up the method of electric energy generation according to the invention.

a—when the maximum of a sea/ocean high tide approaches, opening the valve 17 situated in the supply duct 18 connected with the upper storage reservoir 27 of large capacity (e.g. 1-25 m cubic metres), which results in filling the upper supply reservoir 27 up to a pre-determined maximum level and filling the lower tank 6 situated in it, and closing the valve 17 afterwards, b—opening at the same time air valves 9, 10, as well as valves 11, 12, 13, 14 and 15, which causes inflow of sea water into the vacuum chamber 1 and into the lower situated liquid or water chamber 2 and into the lower situated tank 7, c—after sea water fills up the vacuum chamber 1 and liquid or the water chamber 2, and the lower tank 7 and starts to flow out through the valve 15 to the lower storage reservoir 28, closing valves 13, 14, which results in complete filling up the liquid or water chamber 2 with sea water and partial or complete filling up the vacuum chamber 1 to the level of sea water in the upper supply reservoir 27, d—then closing the air valve 9 and valves 11, 12 and opening valves 13, 14, which results in lowering the height h of the water column and outflow of a portion of liquid or water from the vacuum chamber 1 to liquid or the water chamber 2, and then to the lower tank 7, and then to the lower storage reservoir 28; as a result vacuum or an empty space of lowered air pressure will occur in the vacuum chamber 1.

e—then setting the height h of the liquid or water column is in the liquid or water chambers 2 and if the level is too high, opening the air valve 9 for a specified period of time, which will result in inflow of air to the vacuum chamber 1, and thus lowering height h of liquid or water column to a level below the lower edge of the turbine rotor 3, f—then closing the air valve 9 and opening the valves 11, 12 situated in vacuum chamber 1, which results in a dynamic inflow of liquid or water at high velocity and thus with great kinetic energy into vacuum chamber 1, directed onto the blades of turbine rotor 3. The kinetic energy of liquid or water will be transferred onto the blades of turbine rotor 3 and it will be transformed into rotary motion of the turbine rotor 3 connected with the rotor of power generator 4, which will start the process of electric energy production, g—the liquid or water after flowing into the vacuum chamber 1 will lose its kinetic energy-velocity on the blades of turbine rotor 3 and it will be falling freely to the liquid or water chamber 2 situated below, from where it will flow out, as per the principle of communicating vessels, to the lower tank 7, from where it will be flowing out to the lower storage reservoir 28, in which a valve 32, situated in the discharge duct 19, will stay closed all the time, h—after starting work of electric energy production, liquid or water collected in the upper supply reservoir 27 will gradually have its level lowered for several or up to twenty hours and in the same period of time the sea or ocean high tide will progress and when it reaches its maximum high tide, the valve 17 opens a new portion of liquid or water will flow in and will fill up the upper supply reservoir 27 to its maximum and then the valve 17 will get closed.

By providing adequately large capacity of the upper supply reservoir 27 and capacity of the lower storage reservoir 28 proportionally larger than the capacity of upper supply reservoir 27, it is possible to ensure continuous operation and electric energy production by appropriate adjustment of water flow parameters, by at least one turbine 3.

The Principle of Filling Up Upper Supply Reservoir 27 and Emptying Lower Storage Reservoir 28 a—when the maximum of a sea/ocean high tide approaches, upper supply reservoir 27 is filled up with sea water to its maximum level, after which it is possible to start up water power plant and electric energy production, and sea water, after passing through the turbine rotor 3 will be collected in the lower storage reservoir 28, b—when the sea/ocean level gets close its minimum, then at least one valve 32 will get open in at least one discharge duct 19 and the lower storage reservoir 28, filled with water, will be emptied completely, after which valve 32 should be closed (alternatively this reservoir can be emptied by means of pump 45 installed in the discharge duct 19), c—with the sea/ocean consecutive high tides and ebb tides, the cycles of operation, that is filling up the upper supply tank 27 and electric energy generation, and emptying the lower storage reservoir 28, shall be repeated cyclically and the water power plant will be able to work all the time 24 hours a day.

The tidal water power plant can be built and operate in the regions of medium sea and ocean tides, of height at least 5-7 metres and for this purpose shallow liquid or water reservoirs should be designed and built, e.g. 1-2 metres in depth, having large surface area, e.g. 100 hectares-1000 hectares, and of small height h of water column, e.g. 1.5-2 metres.

On the other hand, in the regions of sea and ocean tides of higher height, e.g. 10-18 metres, there is a possibility to use a few cascades situated between the upper supply reservoir 27 and the lower storage reservoir 28, which will substantially increase the amount of electric energy produced.

Example IV

Figure 4:
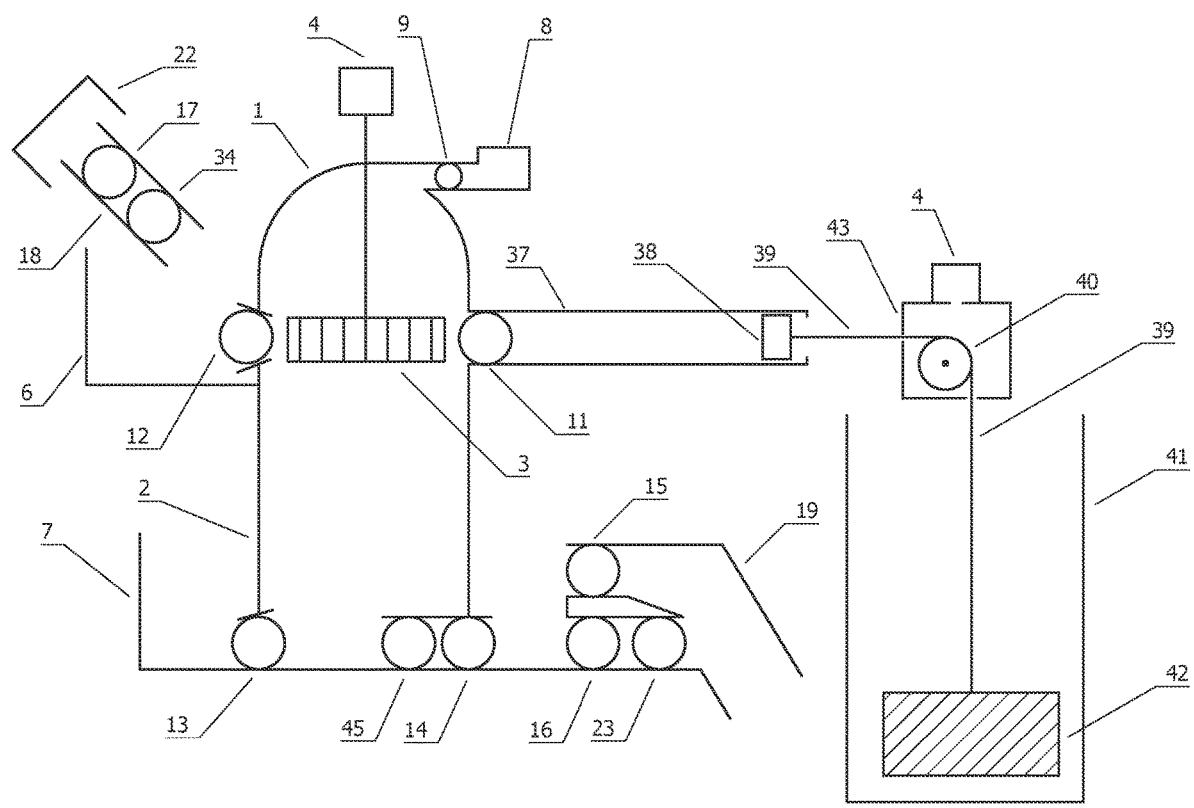
FIG. 4—depicts a schematic diagram of a gravitational-and-ballast water power plant according to the fourth embodiment.

In FIG. 4 a schematic diagram is shown of the fourth embodiment of the invention in a form of a piston-ballast water power plant, which—apart vacuum (vacuum energy) makes use of gravitation force (gravitation energy) affecting the ballast, the plant is situated preferably on a bank of a river, stream, water channel, on a bank of a water reservoir, e.g. water dam/barrage, weir, waterfall or and/or in industrial sites (e.g. in refineries).

Reference numerals of elements presented in FIG. 4 are identical to those presented in FIG. 1, FIG. 1*a*, FIG. 2 and FIG. 3.

Unlike the embodiments described above, the pressure vessel 1, 2 according to the fourth embodiment comprises a vacuum cylinder 37 hermetically connected with the vacuum chamber 1. Preferably, the vacuum cylinder 37 is substantially placed horizontally and is connected with inflow opening of the vacuum chamber 1, and in this opening valve 11 is installed. A piston 38 performs reciprocating motion in vacuum cylinder 37, connected, by means of the mechanical transmission 43 (e.g. a belt transmission or a chain transmission), with a ballast 42 placed inside a silo 41. In this example the piston 38 is connected by a pull cable 39 (e.g. a rope, belt, chain) with the ballast 42. The pull rod 39 wraps around a pulley 40 (possibly a windlass or gear wheel) connected with the additional power generator 4. The shift of piston 38 and ballast 42 sets the pulley 40 into motion, which results in electric energy production by an additional power generator.

In another version of this embodiment, the mechanical transmission 43 drives a water/liquid pump which will produce electric energy indirectly or it can be used to pump water/liquid in various applications.

The ballast 42 is a very heavy weight, preferably 5-50 tonnes (MT) and is placed inside the silo 41 at work depth e.g. 100 metres or more below the ground. The depth of the silo 41 depends on the work length of the vacuum cylinder 37, which, in such a case, also should be 100 metres or more.

In yet another version of this embodiment the silo 41 can be replaced by a tower—a structure on the ground.

The Principle of Start-Up and Operation of a Piston-and-Ballast Water Power Plant in FIG. 4

The general design and the principles of start-up and operation are similar to the design and the principles of start-up and operation of the water power plant presented in FIG. 1-3, therefore only the differences resulting from the use of the vacuum cylinder 37 with the ballast 42 will be described.

After opening the air valve 9 and valves 11, 12, 13, 14, 15, 17 liquid or water flows into the upper tank 6, into vacuum chamber 1, into the liquid or water chamber 2, and then into the lower tank 7, and—after filling it up—liquid or water will start to flow out through the valve 15 and into the discharge duct 19. Then valves 13, 14 get closed, which results in rising the liquid and water level, which will completely fill in the liquid and water chamber 2 and then the vacuum chamber 1 and the vacuum cylinder 37 to the level of liquid or water in the upper tank 6. Then the piston 38 will be in its initial position and ballast 42 will be lowered to the silo 41 bottom.

Unlike the embodiment described above, the stage of achieving vacuum comprises not only achieving vacuum in the vacuum chamber 1 but also in the vacuum cylinder 37. In order to do this, the air valve 9 and valve 12 installed in the vacuum chamber 1 should be closed and then valves 13, 14 located in the lower part of liquid or water chamber 2 should be opened, which will result in discharge of a portion of liquid or water and thus lowering the height h of liquid or water in vacuum chamber 1 and in vacuum cylinder 37, to a level below the bottom edge of turbine rotor 3 and below the lower edge of vacuum cylinder 37, as a result of which an empty space—vacuum is achieved in the vacuum chamber 1 and in the vacuum cylinder 37.

In order to obtain vacuum of high value of negative pressure, e.g. 1000-5000 Pa, the water column height h before achieving vacuum should be over 1013 cm. With such values of vacuum negative pressure and with the diameter of the vacuum cylinder 37 and the piston 38 of e.g. 130 cm, which is equivalent to 1 square m, the pressure force of atmospheric pressure on the work area of piston 38 will be about 10 000 kg-10 tonnes (MT).

It is advisable to choose appropriate values of the vacuum negative pressure to prevent boiling of water and steam generation, which would decrease the value of vacuum negative pressure.

Alternatively, in order to obtain vacuum, it is possible to pump out liquid or water by the pump 23 installed in the lower part of liquid or the water chamber 2, after prior closing valves 12, 13.

It is preferable to obtain high column of liquid or water in liquid or water chamber 2, e.g. 800 cm-1000 cm high, which will result in achieving high value negative pressure in the vacuum chamber 1 and in the vacuum cylinder 37.

In order to maintain a stable vacuum negative pressure, especially vacuum of high value of negative pressure (e.g. 1000 Pa), the vacuum pump 8 can be used, connected to the vacuum chamber 1, which will pump out the air (gas) precipitating from liquid or water being affected by lowered pressure, as gases dissolved in liquid or water are released from liquid or water being affected by lowered pressure, which can result in an increase of vacuum negative pressure.

Having high vacuum inside the vacuum chamber 1 and inside the vacuum cylinder 37 (e.g. of magnitude of 3000 Pa) will result in creation of big pressure force—air pressure force, on the external surface of the piston 38, being at normal atmospheric pressure, on the side of open end of the vacuum cylinder 37 and it will result in shifting the piston 38 to the inside of the vacuum cylinder 37—towards the vacuum chamber 1.

The piston 38 is connected with the ballast 42 by the pull cable 39 (rope/belt/chain) which is connected—it wraps around the pulley 40 and the pressure force of air, being at normal atmospheric pressure—1013 hPa, will cause sliding the piston 38 to vacuum cylinder 37 and—at the same time—lifting the ballast 42 in the silo 41 and rotation of the pulley 40.

During generating vacuum in the vacuum chamber 1 and inside vacuum cylinder 37 the pressing force of atmospheric pressure will result in pushing—shift of the piston 38 to the inside of the vacuum cylinder 37 with simultaneous lifting the ballast 42 to the upper turning point in the silo 41.

If there is a high-value negative pressure vacuum (e.g. 3000 Pa) inside the vacuum chamber 1 and thus inside the vacuum cylinder 37 and normal atmospheric pressure of 1013.25 hPa is exerted on the external plane of the piston 38, perpendicular to the axis of the vacuum cylinder 37 of diameter of 130 cm, which is equivalent to 1 square metre, then pressing force of the atmospheric pressure of 1 kg will be exerted on one square centimetre of the surface of the piston 38, which—with the working surface of the piston 38 equal 1 square m—it will make a force affecting the entire piston 38 of a value approximately 10,000 kG, that is 10 tonnes (MT).

Selecting the parameters of the ballast 42—its weight should be respectively smaller than the pressing force of atmospheric pressure effected on the piston 38 moved inside the vacuum cylinder 37.

The pull cable 39, being shifted along with the piston 38 into the inside of the vacuum cylinder 37, will set in motion the pulley 40 fixed on a shaft of the mechanical transmission 43, which can be so called freewheel in one direction or it can be disengaged, e.g. by a clutch with a mechanism of the mechanical transmission 43.

On the other hand, when the piston 38 is sliding out of the vacuum cylinder 37 when the ballast 42 is falling into the silo 41, that is during execution of work by the ballast 42, the pulley 40 will rotate in the opposite direction and will be coupled with the mechanical transmission 43 which—connected with the rotor of the additional power generator 4, will start the process of electric energy production, for the entire period of the ballast 42 falling down towards the bottom of the silo 41.

Next, the vacuum in the vacuum chamber 1 and inside the vacuum cylinder 37 should be liquidated by opening the valve 12, which will result in a dynamic inflow of liquid or water into the vacuum chamber 1 onto the blades of the turbine rotor 3 and into the vacuum cylinder 37, which will generate electric energy for a defined period of time. The liquid or water flowing in will result in shifting the piston 37 to the initial point at open end of the vacuum cylinder 37, and the free section of the pull rod 39 will fall inside the silo 41, while the ballast 42 will start falling slowly into the inside of the silo 41, and at the same time it will result in rotation of the pulley 40 which—set in rotary motion—will drive the rotor of the additional power generator 4 and start electric energy production in the first work cycle, for the entire period of time of falling the ballast 42 to the bottom of the silo 41.

The rotating pulley 40 will rotate slowly along with the input shaft of the mechanical transmission 43, setting into fast rotary motion the output shaft of the mechanical transmission 43, connected with the rotor of additional the power generator 4, which starts the process of electric energy production in a given work cycle, i.e. for the entire time period of falling down the ballast 42.

After falling the ballast 42 onto the bottom of the silo 41 the process of electric energy production in a given work cycle will end, and another process of attaining vacuum in the vacuum chamber 1 and inside the vacuum cylinder 37, and the process of electric energy production should be started from the beginning in a manner given above.

The valve 11 can be applied in the vacuum cylinder 37, which will provide a possibility of the closing cylinder 37 during the ballast 42 falling down and in this period of time there is a possibility of creating vacuum only in the vacuum chamber 1 and switching into the water power plant working mode, in compliance with the embodiment example shown in FIG. 1

In another preferable version of this embodiment, not shown in the drawings, there is a possibility of using one mechanical transmission 43 having at least two pulleys 40 (alternatively windlasses or gear wheels), connected with at least one additional power generator 4, fed—driven in a continuous manner, alternately from at least blocks—sets of two vacuum cylinders 37 and two blocks of ballast 42.

Alternatively, the use of a flexible membrane is envisaged instead of piston 38 and construction of a power plant of cascade type. There is also a possibility to use more than one vacuum cylinder 37, e.g. two cylinders connected with one vacuum chamber 1 and to use more than one ballast 42.

In other preferable versions of this embodiment, a column of liquid or water of smaller height, e.g. 5 metres high, can be used and then the value of negative pressure in the vacuum chamber 1 and inside the vacuum cylinder 37 will be about a half of the value of atmospheric pressure, that is approximately 507 hPa, which will generate the pressing force of the atmospheric pressure on the external surface of the piston 38 of the value of 0.5 kG/cm2 and the pressing force—thrust on the piston 38 having the surface area perpendicular to the axis of vacuum cylinder 37—1 square metre will be approximately 5 000 kG-5 tonnes (MT).

Using lower columns of liquid or water will allow to decrease the height of the whole structure of water power plant, e.g. from 12 metres, when the height h of liquid or water is approximately 10 metres, to about 7 metres of the power plant construction, that is the height of vacuum chamber 1 and the vacuum cylinder 37 and of liquid or the water chamber 2 and the lower tank 7, when height h of the liquid or water column is around 5 metres, which will permit to have more cascade stages in a given sloping section of a river or stream.

Preferably, the water power plant is situated on mountainous rivers, streams which do not have too big water flow volume but they have big current gradients (falls), which may allow to build and operate many stages, which can be situated in river or stream currents or in liquid or water reservoirs, as it is shown, as an example, in FIG. 3.

In other preferable versions of this embodiment, not shown in the drawings, the water power plant can be situated in industrial sites, owing to which other factors can be used—a different liquid, instead of water, which are pumped over to various levels, e.g. crude oil and its derivates, liquid chemical compounds or waste water flowing in sewage systems and in waste water treatment plants, and also liquids, including water, crude oil, transferred via transfer pipelines, which rise and fall with the topography area.

It should also be noted that it is possible to envisage a version of the embodiment without turbine rotor 3 installed in vacuum chamber 1. In such a case electric energy will be generated by motion of a moving element (piston 38 or membrane) driven as a result of pressure difference between vacuum chamber and ambient pressure (outside the chamber), and this moving element is coupled with the power generator 4. This version is the same as the embodiment from FIG. 4, in which the turbine rotor 3 was removed from the vacuum chamber 1.

Example V

Figure 5:
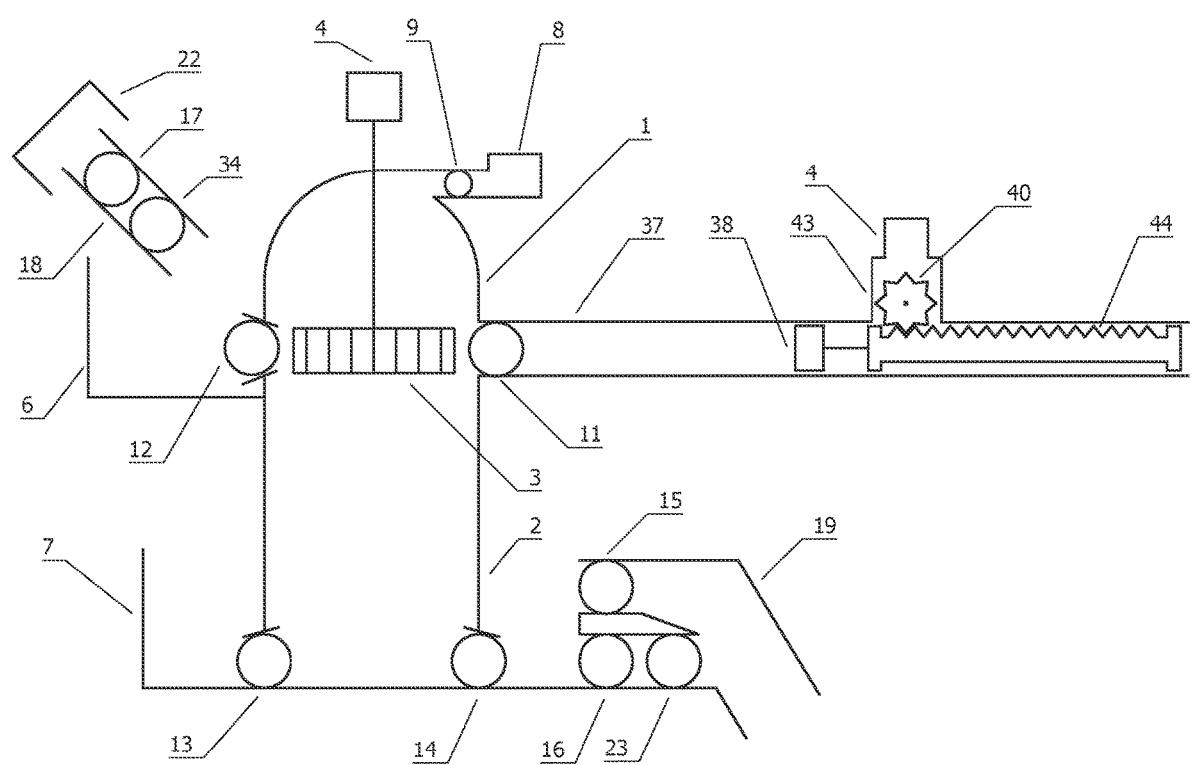
FIG. 5—depicts a schematic diagram of a piston-and-rail water power plant according to the fifth embodiment.

FIG. 5 presents schematic diagram of the fifth embodiment in the form of piston-bar water power plant, which—in order to produce electric energy—uses vacuum—energy of vacuum and a mechanism transforming the plane motion of the piston 38, e.g. a toothed bar 44 or a chain or friction windlass.

Reference numerals of elements presented in FIG. 5 are identical to those presented in FIG. 4. The differences will be described below.

The element constituting driving gear wheel 40 (alternatively a windlass or friction pulley) is sliding toothed bar 44 (or a friction bar) which—shifted by piston 38—causes rotation of gear wheel 40 driving a mechanical transmission 43 and, indirectly, a rotor of additional power generator 4, which results in electric energy production.

Instead of the toothed bar 44, a rope or a chain, or a belt can be used.

The line or chain or belt can be wrapped around a windlass/gear wheel/friction pulley and its ends fixed at the beginning and end of the sliding toothed bar 44.

The principle of obtaining vacuum is similar to the principle of obtaining vacuum in all other examples and, in particular, it is the same as presented in the fourth embodiment in FIG. 4.

Also the principle of operation is similar to the principle of operation of the water power plant presented in FIG. 4 with that difference that the piston 38 drives—shifts the toothed bar 44 which, engaged with the gear wheel 40, sets it in rotary motion, which results in electric energy production by the power generator 4.

The toothed bar 44 can be placed in an extended part of the vacuum cylinder 37, opened on the side of its open end and, mounted in a sliding manner, connected with the piston 38.

During filling the vacuum chamber 1 and the vacuum cylinder 37 with liquid or water, the liquid or water flowing out shifts the piston 38 to its initial position—a return position of work stroke.

While moving the piston 38 to its initial position, return position of work stroke, the toothed bar 44 is also shifted and it engages with gear wheel 40, causing its rotation but it does not cause any rotation of mechanical transmission 43, as the gear wheel 40 is a freewheel in one direction or is disengaged from the mechanical transmission 43, e.g. by a clutch.

On the other hand, when the gear wheel 40 starts rotation in the opposite direction, while the toothed bar 44 is sliding into the vacuum cylinder 37, then the gear wheel 40 will get engaged with a shaft or the clutch installed in the mechanical transmission 43, which will start the process of electric energy generation in a given work cycle. After shifting the piston 38 and the toothed bar 44 to their end position, return position of the work stroke, which can take e.g. several tens of minutes or longer, the whole cycle of obtaining vacuum and electric energy production will be repeated. In this example of the embodiment, a continuous process of electric energy generation is possible, in a similar manner as described in this example of the embodiment presented in FIG. 4.

The valve 11 was applied in the vacuum cylinder 37, which will provide a possibility of closing the vacuum cylinder 37 during shift of the toothed bar 44 and in this period of time there is a possibility of creating vacuum only in the vacuum chamber 1 and switching the piston-bar water power plant into the water power plant working mode, from the first embodiment shown in FIG. 1.

Also in this example, like in the case of the fourth example of embodiment, it is possible to envisage a version of the embodiment without the turbine rotor 3 installed in vacuum chamber 1.

The other reference numerals of elements presented in FIG. 5 are identical to those presented in FIG. 1-4.

LIST OF REFERENCE NUMERALS IN THE DRAWINGS

1. Vacuum chamber
2. Liquid or water chamber
3. Turbine/turbine rotor
4. power generator
5. Shaft connecting/coupling the turbine/turbine rotor with the power generator
6. Upper tank for liquid or water
7. Lower tank for liquid or water
8. Vacuum pump
9. Air valve
10. Air valve
11. Water/liquid valve
12. Water/liquid valve
13. Water/liquid valve
14. Water/liquid valve
15. Water/liquid valve
16. Water/liquid valve
17. Water/liquid valve
18. Supply duct of water/liquid
19. Discharge duct of water/liquid
20. Air ventilation duct
21. Thermal and hermetic protecting guard
22. Filtering grate
23. Water/liquid pump
24. Supply duct
25. Main connecting duct
26. Outlet duct
27. Upper supply reservoir
28. Lower storage reservoir
29. Water/liquid pump
30. Water/liquid valve
31. Connecting tube
32. Water/liquid valve
33. Water/liquid pump
34. Water/liquid pump
35. Directing devices
36. Water/liquid pump
37. Vacuum cylinder
38. Piston
39. Pull cable
40. Pulley
41. Silo
42. Ballast
43. Mechanical transmission
44. Toothed bar
45. Water/liquid pump

The invention claimed is:

1. A method of electric energy generation, in which the energy of a liquid or water is transformed in electrical energy, characterized by:
   providing a pressure vessel, comprising:
   a first closing means which closes and opens an inflow opening through which a liquid or water is supplied to the pressure vessel by a means for feeding the liquid or water;
   a second closing means which closes and opens an outflow opening through which a liquid or water is discharged outside from the pressure vessel by a means for discharging the liquid or water;

a turbine with a power generator for generating electric energy where a turbine rotor is situated inside said pressure vessel;

supplying a liquid or water to the inside of the pressure vessel towards the turbine rotor which, while rotating, drives the power generator; generating negative pressure or vacuum inside the pressure vessel in its top part which constitutes a vacuum chamber in whose space the turbine rotor is installed;

setting a height (h) of a liquid or water column in the lower part of the pressure vessel constituting a water or liquid chamber below the turbine rotor, wherein the vacuum chamber is directly connected with the liquid or water chamber situated below and a conventional interface between the vacuum chamber and the water or liquid chamber is determined by the upper surface of the column of liquid or water;

then the first closing means is opened and the liquid or water is supplied, by the means for supplying the liquid or water to the vacuum chamber, directing the liquid or water to the turbine rotor in such a way that due to the pressure difference between the negative pressure or vacuum in the vacuum chamber and a higher pressure outside the pressure vessel, preferably the atmospheric pressure, which exerts pressure on the liquid or water supplied from outside, the liquid or water flows at high velocity into the vacuum chamber and rotates the turbine rotor which drives the power generator and produces electric energy;

maintaining the height (h) of the liquid or water column in the liquid or water chamber below the turbine rotor by discharging a surplus of liquid or water outside the pressure vessel by opening the second closing means and discharging the liquid or water by a means for discharging a liquid or water.

2. The method according to claim 1 characterized in that the open end of the pressure vessel is located in a lower tank or in a lower stream filled with liquid or water on a free surface of which the atmospheric pressure is exerted.

3. The method according to claim 1, characterized in that generating vacuum in the vacuum chamber comprises:

closing the second closing means, which opens and closes the outflow opening between the pressure vessel and the lower tank or the lower stream in which the pressure vessel is placed, filling the pressure vessel with a liquid or water by opening the first closing means and supplying the water or liquid by the means for supplying a liquid or water, wherein the water column preferably reaches a height above the level of the turbine rotor, and—even more preferably—the entire pressure vessel is completely filled, closing the first closing means and opening the second closing means, as a result of which the column of a liquid or water lowers because of its own weight until it is balanced by the atmospheric pressure exerted on the liquid or water in the lower tank or the lower stream, creating vacuum in the vacuum chamber in the upper part of the pressure vessel in such a way that—in the state of equilibrium (balance)—the upper surface of the column of a liquid or water, which fills the liquid or water chamber, is below the turbine rotor.

4. The method according to claim 1, characterized in that the liquid or water column height (h) is set on a level in the range of 10 cm to 1033 cm and even more preferably over 1033 cm.

5. The method according to claim 1, characterized in that generating vacuum in the vacuum chamber comprises:

opening the second closing means, which opens and closes the outflow opening between the pressure vessel and the lower tank or the lower stream of water, in which the pressure vessel is placed, pumping out the air from the pressure vessel by means of at least one vacuum pump, which results in lifting the level of the column of a liquid or water to a required level below the bottom edges of the turbine rotor and creating vacuum in the vacuum chamber in the upper part of the pressure vessel.

6. The method according to claim 1, characterized in that creating vacuum in the vacuum chamber comprises pumping out a liquid or water which previously filled the pressure vessel, until the level of the liquid or water column is lowered below the turbine rotor and creating vacuum in the vacuum chamber in the upper part of the pressure vessel.

7. The method according to claim 6, characterized in that in order to maintain a negative pressure or vacuum in the vacuum chamber and in order to maintain the level of the column of a liquid or water below the turbine rotor, during the step of supplying a liquid or water to the vacuum chamber, the liquid or water is pumped out from the pressure vessel, preferably in the volume equal to the volume of a liquid or water which will flow into the vacuum chamber and fall down to the liquid or water chamber.

8. The method according to claim 1, characterized in that the liquid or water is supplied to the pressure chamber from an upper tank for liquid or water which directly surrounds (contains) the vacuum vessel in the area of the vacuum chamber or which is connected by means of a supplying duct or a channel with the upper tank.

9. The method according to claim 1, characterized in that a liquid or water is supplied to the vacuum chamber from a water stream, directly or by the means for supplying a liquid or water, especially by ducts or channels, wherein the vacuum chamber is situated in said water stream or at the height of the water stream.

10. The method according to claim 1, characterized in that the negative pressures or vacuum created in the vacuum chamber adopts the values below the values of pressure outside the vacuum chamber at a given moment and this pressure is preferably the atmospheric pressure, wherein the negative pressure or vacuum preferably adopts the values in the range of 1 Pa to 101 324 Pa.

11. A power generation system for generating electric energy, characterized in that said system comprises:

a pressure vessel comprising:

an at least one inflow opening;

an at least one outflow opening;

a first closing means which closes and opens the inflow opening through which a liquid or water is supplied to the pressure vessel by a means for feeding a liquid or water;

a second closing means which closes and opens the outflow opening through which a liquid or water is discharged outside from the pressure vessel by the means for discharging a liquid or water;

a means for supplying a liquid or water to the inside of the pressure vessel; a means for discharging a liquid or water outside from the pressure vessel; an at least one turbine where a turbine rotor is situated inside the pressure vessel;

power generator for generating electric energy coupled with the turbine, said system further comprises means for creating and/or maintaining negative pressure or vacuum inside the pressure vessel, where said pressure vessel comprises a vacuum chamber adapted for creating a negative pressure or vacuum inside said chamber, and a liquid or water chamber adapted for filling with a liquid or water, wherein the vacuum chamber is situated in the upper part of the pressure vessel and the liquid or water chamber is situated in the lower part of the pressure vessel, below the pressure chamber, and an interface between the vacuum chamber and the liquid or water chamber is variable in time and depends on the state of work of the system or the work cycle and is determined by the upper surface of the liquid or water column which fills the liquid or water chamber, dividing the pressure vessel into two media, i.e. a first one constituting the vacuum chamber in which there is a negative pressure or vacuum and a second one constituting the water or liquid chamber which is filled with water or a liquid in such a manner that—in the cycle of electric energy production—the upper surface of the water or liquid column is situated substantially below the turbine rotor located in the vacuum chamber, wherein the at least one inlet opening is situated in the vacuum chamber in such a way that the liquid or water supplied to the vacuum chamber by the means for supplying a liquid or water is directed towards the turbine rotor effecting its rotation and generating electric energy by the power generator.

12. The system according to claim 11, characterized in that it further comprises an upper tank for a supplying liquid or water, which flows into the vacuum chamber by the at least one inflow opening.

13. The system according to claim 12, characterized in that the upper tank is situated around the vacuum chamber, substantially in the area and at height of the at least one inflow opening, wherein the vacuum chamber is situated directly in said upper tank.

14. The system according to claim 12, characterized in that the upper tank is connected by a supply duct with the at least one inflow opening in the vacuum chamber.

15. The system according to claim 11, characterized in that it further comprises a lower tank for a liquid or water, in which at least the bottom part of the liquid or water chamber is placed in such a way that a flow of the liquid or water is provided between the lower tank and the liquid or water chamber, especially through the outflow opening located in the liquid or water chamber.

16. The system according to claim 11, characterized in that at least one valve, preferably situated in the at least one inflow opening in the vacuum chamber, constitutes the first closing means.

17. The system according to claim 15, characterized in that at least one valve providing regulated flow of a liquid or water between the lower tank and the liquid or water chamber, preferably situated in the at least one outflow opening in the liquid or water chamber, constitutes the second closing means.

18. The system according to claim 11, characterized in that it further comprises an upper supply reservoir for liquid or water, in which the entire upper tank is contained.

19. The system according to claim 11, characterized in that it further comprises a lower storage reservoir for liquid or water, in which the entire lower tank is contained.

20. The system according to claim 11, characterized in that the vacuum chamber comprises an air valve and a vacuum pump.

21. The system according to claim 11, characterized in that it comprises a vacuum cylinder with an open end, connected with the vacuum chamber, wherein a movable sliding element is placed in the vacuum cylinder, said element being preferably a piston or a membrane, for driving an additional power generator for generating electric energy by displacement of said movable element due to a difference of pressure between the vacuum chamber and the atmospheric pressure outside the vacuum chamber.

22. The system according to claim 21, characterized in that the piston is connected with a pull cable to a ballast and the pull cable is coupled with the additional power generator for generating electric energy, preferably by a mechanical transmission.

23. The system according to claim 21, characterized in that the piston is connected with a toothed bar coupled with the additional power generator for generating electric energy, preferably by a mechanical transmission.

24. The system according to claim 11, characterized in that it further comprises plurality of pressure vessels, each of which constitute a separate stage, wherein the stages are connected in such a way that they form a cascade system.

25. A generation system for generating electric energy, especially a water plant, in which the energy of a liquid or water is transformed into electric energy, characterized in that said system comprises the:

a pressure vessel, comprising:
an at least one inflow opening;
an at least one outflow opening;
a first closing means which closes and opens the inflow opening through which a liquid or water is supplied to the pressure vessel by a means for supplying a liquid or water;
a second closing means which closes and opens the outflow opening through which a liquid or water is discharged outside from the pressure vessel by a means for discharging a liquid or water;
a means supplying a liquid or water to the inside of the pressure vessel;
a means for discharging a liquid or water outside from the pressure vessel; an at least one turbine;
an at least one power generator for generating electric energy coupled with the turbine;
a means for creating or maintaining negative pressure or vacuum inside the pressure vessel;
wherein said pressure vessel comprises a vacuum chamber adapted for creating a negative pressure or vacuum inside said chamber, and a liquid or water chamber adapted for filling with a liquid or water,
wherein the vacuum chamber is situated in the upper part of the pressure vessel and the liquid or water chamber is located in the lower part of the pressure vessel, below the pressure chamber,
and an interface between the vacuum chamber and the liquid or water chamber is variable in time and depends on the state of work of the system or the work cycle and is determined by the upper surface of a liquid or water column filling the liquid or water chamber, dividing the pressure vessel into two media,
wherein a turbine rotor is placed outside the pressure vessel in such a manner that it can be driven by a supplying liquid or water supplied by the means for supplying the liquid and water to the pressure vessel.

26. The system according to claim 25, characterized in that the turbine rotor is situated in a duct supplying the supplying liquid or water and connecting an upper tank with the inflow opening in the vacuum chamber.

27. The system according to claim 25, characterized in that the turbine rotor is situated in the vacuum chamber in such a way that the liquid or water flowing into the pressure vessel is directed through the inflow opening in the vacuum chamber onto the turbine rotor effecting its rotation and generating electric energy by the power generator.

28. A power generation system for generating electric energy, especially a water plant, in which the energy of a liquid or water is transformed into electric energy, characterized in that said system comprises:
- a pressure vessel, comprising:
- an at least one inflow opening;
- an at least one outflow opening;
- first closing means which closes and opens the inflow opening through which a liquid or water is supplied to the pressure vessel by a means for supplying a liquid or water;
- a second closing means which closes and opens the outflow opening through which a liquid or water is discharged outside from the pressure vessel by a means for discharging a liquid or water;
- a means for supplying a liquid or water to the inside of the pressure vessel; a means for discharging a liquid or water outside from the pressure vessel; an at least one turbine;
- an at least power generator for generating electric energy coupled with the turbine;
- a means for creating or maintaining negative pressure or vacuum inside the pressure vessel;
- wherein said pressure vessel comprises a vacuum chamber adapted for creating a negative pressure or vacuum inside the chamber, and a liquid or water chamber adapted for filling with a liquid or water,
- wherein the vacuum chamber is situated in the upper part of the pressure vessel and the liquid or water chamber is located in the lower part of the pressure vessel, below the pressure chamber,
- wherein an interface between the vacuum chamber and the liquid or water chamber is variable in time and depends on the state of work of the system or the work cycle and is determined by the upper surface of a liquid or water column filling the liquid or water chamber, dividing the pressure vessel into two media, i.e. a first one constituting the vacuum chamber in which there is a negative pressure or vacuum and a second one constituting the water or liquid chamber filled with a water or liquid in such a manner that—in the cycle of electric energy production—the upper surface of the water or liquid column in situated substantially below the first closing means or the at least one inflow opening located in the vacuum chamber, wherein the system further comprises a vacuum cylinder with an open end, connected with the vacuum chamber, wherein a movable sliding element is placed in said vacuum cylinder, the movable sliding element being preferably a piston or a membrane, for driving the power generator by displacement of said movable sliding element due to the difference of pressure between the vacuum chamber and a higher pressure outside the vacuum chamber, the latter is preferable the atmospheric pressure.

29. The system according to claim 28, characterized in that the piston is connected with a pull cable to a ballast and the pull cable is coupled with an additional power generator for generating electric energy, preferably by a mechanical transmission.

30. The system according to claim 28, characterized in that the piston is connected with a toothed bar coupled with the additional power generator, preferably by a mechanical transmission.

31. The system according to claim 28, characterized in that the turbine rotor is situated in the vacuum chamber in such a way that a liquid or water flowing into the pressure vessel is directed through the inflow opening in the vacuum chamber onto the turbine rotor effecting its rotation and generating electric energy by the power generator.

\* \* \* \* \*